(12) United States Patent
Camilo et al.

(10) Patent No.: US 11,472,950 B2
(45) Date of Patent: Oct. 18, 2022

(54) MODIFIED ETHYLENE VINYL ACETATE COMPOSITIONS, POLYMER BLENDS AND FILMS MADE THEREFROM

(71) Applicant: Braskem S.A., Camaçari (BR)

(72) Inventors: Ana Paula Rodrigues Camilo, São Paulo (BR); Camilo Delfino, São Paulo (BR); Gislene Zehetmeyer, São Paulo (BR); Giancarlos Delevati, São Paulo (BR); Mauro Alfredo Soto Oviedo, São Paulo (BR)

(73) Assignee: Braskem S.A., Camaçari (BR)

(*) Notice: Subject to any disclaimer, the term of this patent is extended or adjusted under 35 U.S.C. 154(b) by 0 days.

(21) Appl. No.: 16/472,481

(22) PCT Filed: Dec. 21, 2017

(86) PCT No.: PCT/BR2017/050398
§ 371 (c)(1),
(2) Date: Jun. 21, 2019

(87) PCT Pub. No.: WO2018/112593
PCT Pub. Date: Jun. 28, 2018

(65) Prior Publication Data
US 2019/0315951 A1 Oct. 17, 2019

Related U.S. Application Data

(60) Provisional application No. 62/437,201, filed on Dec. 21, 2016.

(51) Int. Cl.
| | |
|---|---|
| *C08L 29/14* | (2006.01) |
| *C08L 23/08* | (2006.01) |
| *C08F 18/14* | (2006.01) |
| *C08F 212/08* | (2006.01) |
| *C08F 220/34* | (2006.01) |
| *C08K 3/36* | (2006.01) |
| *C08K 5/14* | (2006.01) |
| *C09J 123/08* | (2006.01) |
| *C08K 3/30* | (2006.01) |

(52) U.S. Cl.
CPC ........ *C08L 23/0853* (2013.01); *C08F 18/14* (2013.01); *C08F 212/08* (2013.01); *C08F 220/34* (2013.01); *C08K 3/36* (2013.01); *C08K 5/14* (2013.01); *C09J 123/0853* (2013.01); *C08K 2003/3045* (2013.01); *C08L 2310/00* (2013.01); *C09J 2400/226* (2013.01); *C09J 2423/046* (2013.01); *C09J 2423/106* (2013.01); *C09J 2427/006* (2013.01); *C09J 2467/006* (2013.01); *C09J 2475/006* (2013.01); *C09J 2477/006* (2013.01)

(58) Field of Classification Search
CPC ...... C08L 23/0853; C08L 67/04; C08F 18/14; C08F 220/03; C08F 118/08; C08F 255/026; C08F 220/34; C09D 123/0853; C09J 131/04
See application file for complete search history.

(56) References Cited

U.S. PATENT DOCUMENTS

| | | | | |
|---|---|---|---|---|
| 3,558,492 | A * | 1/1971 | Proskow | G11B 5/7022 360/134 |
| 4,994,267 | A * | 2/1991 | Sablotsky | A61K 9/7053 514/182 |
| 6,787,280 | B2 * | 9/2004 | Yamashita | G03G 9/0804 430/108.6 |
| 2011/0258917 | A1 * | 10/2011 | Garcia Castro | C10L 10/08 44/404 |
| 2014/0336308 | A1 * | 11/2014 | Mateu | C08L 91/06 524/27 |

FOREIGN PATENT DOCUMENTS

WO 2011-134923 A1 11/2011

OTHER PUBLICATIONS

International Search Report issued in International Application No. PCT/BR2017/050398, dated May 16, 2018 (5 pages).
Written Opinion issued in International Application No. PCT/BR2017/050398, dated May 16, 2018 (6 pages).

* cited by examiner

*Primary Examiner* — Gregory Listvoyb
(74) *Attorney, Agent, or Firm* — Osha Bergman Watanabe & Burton LLP

(57) ABSTRACT

Compositions may include an EVA copolymer produced from ethylene, vinyl acetate, and one or more polar comonomers, wherein at least one of the one or more polar comonomers include an amine moiety. Methods may include preparing a polymer composition by adding ethylene, vinyl acetate and one or more polar comonomers to a reactor or extruder, wherein at least one of the one or more polar comonomers include an amine moiety; and reacting the ethylene, vinyl acetate and one or more comonomers to produce the polymer composition. Compositions may include an adhesive film composition that include at least one layer including a polymer produced from ethylene, vinyl acetate, and one or more polar comonomers, wherein at least one of the one or more polar comonomers include an amine moiety.

18 Claims, 4 Drawing Sheets

MODIFIED ETHYLENE VINYL ACETATE COMPOSITIONS, POLYMER BLENDS AND FILMS MADE THEREFROM

BACKGROUND

Polyolefin copolymers such as ethylene vinyl acetate (EVA) may be used to manufacture a varied range of articles, including films, molded products, foams, and the like. In general, polyolefins are widely used plastics worldwide, given their versatility in a wide range of applications. While EVA may have characteristics such as high processability, low production cost, flexibility, low density and recycling possibility. physical and chemical properties such as tackiness and deformability may create difficulties during processing and may exhibit varied responses depending on a number of factors such as molecular weight, distribution of molecular weights, content and distribution of comonomer (or comonomers), method of processing, and the like.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to compositions that may include an EVA copolymer produced from ethylene, vinyl acetate, and one or more polar comonomers, wherein at least one of the one or more polar comonomers include an amine moiety.

In another aspect, embodiments disclosed herein related to methods that may include preparing a polymer composition by adding ethylene, vinyl acetate and one or more polar comonomers to a reactor, wherein at least one of the one or more polar comonomers include an amine moiety; and reacting the ethylene, vinyl acetate and one or more comonomers to produce the polymer composition.

In another aspect, embodiments disclosed herein related to methods that may include preparing a polymer composition by adding ethylene, vinyl acetate and one or more polar comonomers to an extruder, wherein at least one of the one or more polar comonomers include an amine moiety; and reacting the ethylene, vinyl acetate and one or more comonomers to produce the polymer composition.

In another aspect, embodiments disclosed herein relate to compositions that may include an adhesive film composition that include at least one layer including a polymer produced from ethylene, vinyl acetate, and one or more polar comonomers, wherein at least one of the one or more polar comonomers include an amine moiety.

Other aspects and advantages of the claimed subject matter will be apparent from the following description and the appended claims.

DETAILED DESCRIPTION

Figure 1:
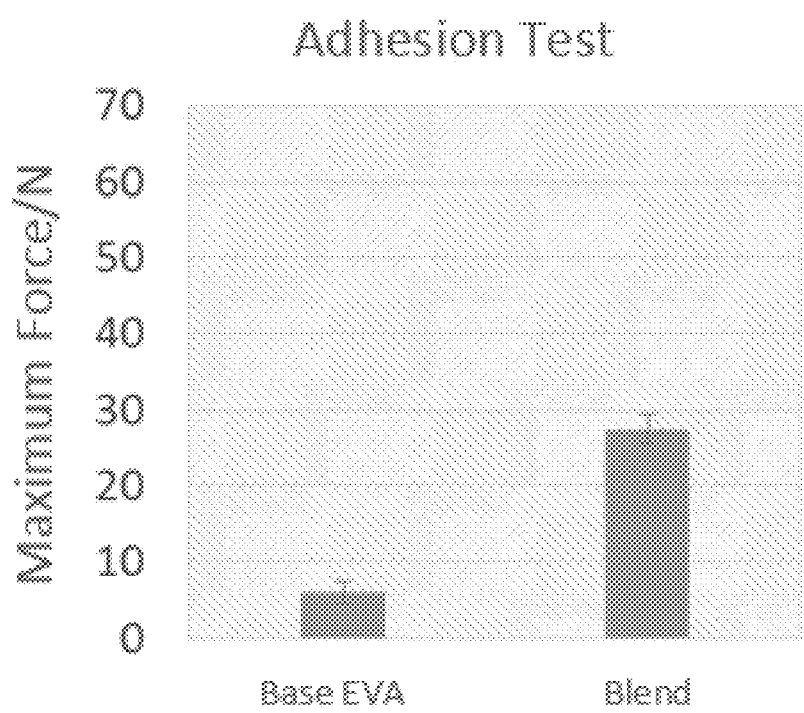
FIGS. 1 and 2 are bar charts showing the results of an adhesion test for film samples in accordance with embodiments of the present disclosure.

In one aspect, embodiments disclosed herein relate to compositions containing ethylene vinyl acetate (EVA) copolymers that are modified to contain one or more polar comonomers. Polymer compositions in accordance with the present disclosure may also be used as an adhesive modifier and compatibilizer in some applications.

EVA is a copolymer of the polyolefin family of elastomers formed by the sequence of random units derived from the polymerization of ethylene and vinyl acetate at high temperature and pressure. EVA copolymers provide materials that can be processed like other thermoplastics, but offer a rubbery character having softness and elasticity. However, EVA copolymers may create issues during processing due to the tackiness and deformability of the material.

In one or more embodiments, polymer compositions may include one or more polar monomers that may increase the polarity of an EVA resin, and may introduce a number of functional groups such as amines and carboxylic acids that increase the interaction and compatibility of EVA or other polymer resins with other polymer types through non-covalent interactions such as hydrogen bonding and ionic bonding. In some embodiments, modified EVA compositions in accordance with the present disclosure may also function as a compatibilizer when added to polymer mixtures containing incompatible or partially compatible polymers.

Polymer compositions in accordance with the present disclosure may be used to prepare adhesive films for woven and nonwoven fabrics and materials. In some embodiments, polymer compositions containing EVA and one or more additional comonomers may exhibit at least 50% higher delamination strength over comparative unmodified EVA resin formulations. Polymer compositions in accordance with the present disclosure may be formulated as a masterbatch composition that is blended with other polymers and resins to prepare a working stock.

In one or more embodiments, modification of EVA polymers in accordance with the present disclosure may be performed by reactive extrusion. Reactive extrusion processes may enable operators to maximize physical plant space, while the reactive extrusion process allows the continuous production of the material, after establishment of equilibrium. The non-use of solvents in large quantity is a good reason to prefer the grafting process of polyolefins by melting processes, i.e., the introduction of reactive groups, using melting chamber or reactive extrusion process.

Ethylene Vinyl Acetate Polymer

Polymer compositions in accordance with the present disclosure may include EVA copolymers incorporating various ratios of ethylene and vinyl acetate, in addition to including one or more additional comonomers. Polymer compositions may be prepared by reacting an EVA polymer resin, prepolymer, or EVA monomers with one or more polar comonomers in some embodiments. In some embodiments, polymer compositions may be formulated as a masterbatch composition that is combined with an EVA resin on site to prepare a working stock prior to use in various applications.

In some embodiments, the EVA can be derived from fossil or renewable sources, e.g., biobased EVA. Biobased EVA is an EVA wherein at least one of ethylene and/or vinyl acetate monomers are derived from renewable sources, such as ethylene derived from biobased ethanol. In some embodiments, EVA resins may be selected from commercially available resins by Braskem such as VA4018R, VA5018A, HM728, 3019PE, 8019PE, PN2021, HM150, HM2528 and combinations thereof.

Polymer compositions in accordance with the present disclosure may include an EVA polymer at a percent by weight of the composition that ranges from a lower limit selected from one of 20 wt %, 55 wt %, 60 wt %, 70 wt % and 89 wt % to an upper limit selected from 80 wt %, 90 wt %, 91 wt %, 95 wt % and 99 wt %, where any lower limit may be paired with any upper limit.

Polymer compositions in accordance with the present disclosure may include an EVA polymer, wherein the percent by weight of vinyl acetate in the EVA polymer ranges from a lower limit selected from one of 8 wt %, 12 wt %, and 18 wt % to an upper limit selected from 28 wt %, 33 wt %, and 40 wt %, where any lower limit may be paired with any upper limit.

Polymer compositions in accordance with the present disclosure may include an EVA polymer, wherein the percent by weight of ethylene in the EVA polymer ranges from a lower limit selected from one of 60 wt %, 66 wt %, and 72 wt %, to an upper limit selected from one of 82 wt %, 88 wt %, and 92 wt %, where any lower limit may be paired with any upper limit.

Polymer compositions in accordance with the present disclosure may include an EVA polymer, wherein the number average molecular weight (Mn) in kilodaltons (kDa) of the EVA polymer ranges from a lower limit selected from one of 5 kDa, 10 kDa, 20 kDa and 25 kDa to an upper limit selected from one of 30 kDa, 35 kDa, 40 kDa and 50 kDa, where any lower limit may be paired with any upper limit.

Polymer compositions in accordance with the present disclosure may include an EVA polymer, wherein the weight average molecular weight (Mw) in kilodaltons (kDa) of the EVA polymer ranges from a lower limit selected from one of 50 kDa, 70 kDa, 90 kDa and 110 kDa to an upper limit selected from one of 120 kDa, 140 kDa, 150 kDa and 180 kDa, where any lower limit may be paired with any upper limit.

Polymer compositions in accordance with the present disclosure may include an EVA polymer, wherein the dispersity (Mw/Mn) of the EVA polymer ranges from a lower limit selected from one of 1.0, 1.5, 3.0 and 4.0 to an upper limit selected from one of 5.0, 6.0, 7.0 and 8.0, where any lower limit may be paired with any upper limit. Polar Comonomer Polymer compositions in accordance with the present disclosure may incorporate one or more polar comonomers, which confers compatibility of EVA with other polar polymers and substrates.

Polar comonomers in accordance with the present disclosure include monomers having at least one double bond and an amine moiety. In some embodiments, the polar comonomer may be of the general formula:

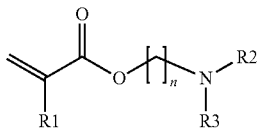

where R1 is hydrogen, methyl or ethyl, R2 is hydrogen, t-butyl, or a C1-C4 alkyl, R3 is a hydrogen or a C1-C4 alkyl, and n is 1-10 and may be linear or branched, saturated or unsaturated. In one or more embodiments, at least one of R2 and R3 is a hydrogen. In some embodiments, polar comonomers may include acrylate or methacrylate monomers functionalized with a primary and/or secondary amine, including 2-(N,N-dimethylamino)ethyl (meth)acrylate, 3-(N,N-dimethylamino)propyl (meth)acrylate, N'-(3-N,N-dimethylamino)propyl (meth)acrylamide, 2-(N,N-dimethylamino) ethyl methacrylate (DMAEMA), 2-(N,N-diethylamino) ethyl methacrylate (DEAEMA), 2-(tert-butylamino)ethyl methacrylate (TBAEMA), 2-(N,N-dimethylamino)propyl methacrylamide (DMAPMAm), 2-(N,N-dimethylamino) neopentyl acrylate (DMANPA), and the like.

In one or more embodiments, polar comonomers may include saturated and unsaturated polycarboxlyic acids having two or more carboxylic acid moieties, such as itaconic acid, citaconic acid, methyl glutamic acid, and the like; saturated and unsaturated anhydrides such as such as maleic anhydride, itaconic anhydride, citaconic anhydride, methyl glutamic anhydride; esters of carboxylic acids such as acrylate, methacrylates, 2-methylene glutarates, methylenesuccinates and phthalates; the acrylates and methacrylate esters of mono- or poly-hydroxy alcohols, such as alkoxy monoalcohols, glycols, triols and tetraols, acrylic acid or methacrylic acid, fumaric acid, 2-propene 1,2-dicarboxylic acid, maleic acid, undecenoic acid, and the like. Examples of ester polar comonomers include methylene-2-dimethyl glutarate, methylene-2-diethyl glutarate, methylene-2-dibutyl glutarate, methylene-2-diallyl glutarate, methylene-2-monomethyl glutarate and methylene-2-monoethyl glutarate.

Other comonomers in accordance with the present disclosure may include saturated and unsaturated esters and multiesters such as methoxy polyethylene glycol acrylates, ethoxy polyethylene glycol acrylates, ethylene glycol diacrylate, ethylene glycol dimethacrylate, polypropylene glycol diacrylate, polypropylene glycol dimethacrylate, 1,3-butylene glycol diacrylate, 1,3-butylene glycol dimethacrylate, neopentyl glycol diacrylate, neopentyl glycol dimethacrylate, trimethylol ethane triacrylate, trimethylol ethane trimethacrylate, trimethylol propane triacrylate, trimethylol propane trimethacrylate, and tetramethylol methane tetracrylate.

In one or more embodiments, polymer compositions in accordance with the present disclosure may contain a percent by weight of the total composition (wt %) of one or more polar comonomers that range from a lower limit selected from one of 0.25 wt %, 1 wt %, 4 wt % and 6 wt % to an upper limit selected from one of 8 wt %, 14 wt %, 20 wt % and 25 wt %, where any lower limit can be used with any upper limit In one or more embodiments, polymer compositions in accordance with the present disclosure may include an EVA polymer that incorporates a mixture of polar comonomers where the molar ratio of first polar comonomer to the second polar comonomer (P1/P2) is in a range having a lower limit selected from one of 0.035, 0.07, 0.35 and 0.5 to an upper limit selected from one of 1, 2, 3.5, and 7, where any lower limit may be paired with any upper limit. In some embodiments, polymer compositions may include an EVA polymer modified with a first polar comonomer having an amine moiety and a second polar comonomer having, for example, at least two carboxylic acid groups combined using the ratios described above.

Peroxide Agent

Polymer compositions in accordance with the present disclosure may include one or more peroxide agents capable of generating free radicals during polymer processing. For example, peroxide agents may be combined with an EVA resin while reacting the polymer with one or more comonomers, such as during a reactive extrusion process. In one or more embodiments, peroxide agents may include bifunctional peroxides such as benzoyl peroxide; dicumyl peroxide; di-tert-butyl peroxide; tert-butyl cumyl peroxide; tert-butyl 3,5,5-trimethylhexanoate peroxide; tert-butyl peroxybenzoate; 2-ethylhexyl carbonate tert-butyl peroxide; 2,5-dimethyl-2,5-di (tert-butylperoxide) hexane; 1,1-di (tert-butylperoxide)-3,3,5-trimethylcyclohexane; 2,5-dimethyl-2,5-di(tert-butylperoxide) hexyne-3; 3,3,5,7,7-pentamethyl-1,2,4-trioxepane; butyl 4,4-di (tert-butylperoxide) valerate; di (2,4-dichlorobenzoyl) peroxide; di(4-methylbenzoyl) peroxide; peroxide di(tert-butylperoxyisopropyl) benzene; and the like.

Peroxide agents may also include benzoyl peroxide, 2,5-di(cumylperoxy)-2,5-dimethyl hexane, 2,5-di(cumylperoxy)-2,5-dimethyl hexyne-3,4-methyl-4-(t-butylperoxy)-2-pentanol, 4-methyl-4-(t-amylperoxy)-2-pentanol, 4-methyl-4-(cumylperoxy)-2-pentanol, 4-methyl-4-(t-butylperoxy)-2-pentanone, 4-methyl-4-(t-amylperoxy)-2-pentanone, 4-methyl-4-(cumylperoxy)-2-pentanone, 2,5-dimethyl-2,5-di(t-butylperoxy)hexane, 2,5-dimethyl-2,5-di(t-amylperoxy)hexane, 2,5-dimethyl-2,5-di(t-butylperoxy)hexyne-3, 2,5-dimethyl-2,5-di(t-amylperoxy)hexyne-3, 2,5-dimethyl-2-t-butylperoxy-5-hydroperoxyhexane, 2,5-dimethyl-2-cumylperoxy-5-hydroperoxy hexane, 2,5-dimethyl-2-t-amylperoxy-5-h ydroperoxyhexane, m/p-alpha, alpha-di[(t-butylperoxy)isopropyl]benzene, 1,3,5-tris(t-butylperoxyisopropyl)benzene, 1,3,5-tris(t-amylperoxyisopropyl)benzene, 1,3,5-tris(cumylperoxyisopropyl)benzene, di[1,3-dimethyl-3-(t-butylperoxy)butyl]carbonate, di[1,3-dimethyl-3-(t-amylperoxy) butyl]carbonate, di[1,3-dimethyl-3-(cumylperoxy)butyl]carbonate, di-t-amyl peroxide, t-amyl cumyl peroxide, t-butyl-isopropenylcumyl peroxide, 2,4,6-tri(butylperoxy)-s-triazine, 1,3,5-tri[1-(t-butylperoxy)-1-methylethyl]benzene, 1,3,5-tri-[(t-butylperoxy)-isopropyl] benzene, 1,3-dimethyl-3-(t-butylperoxy)butanol, 1,3-dimethyl-3-(t-amylperoxy)butanol, di(2-phenoxyethyl) peroxydicarbonate, di(4-t-butylcyclohexyl)peroxydicarbonate, dimyristyl peroxydicarbonate, dibenzyl peroxydicarbonate, di(isobornyl)peroxydicarbonate, 3-cumylperoxy-1,3-dimethylbutyl methacrylate, 3-t-butylperoxy-1,3-dimethylbutyl methacrylate, 3-t-amylperoxy-1,3-dimethylbutyl methacrylate, tri(1,3-dimethyl-3-t-butylperoxy butyloxy)vinyl silane, 1,3-dimethyl-3-(t-butylperoxy)butyl N-[1-{3-(1-methylethenyl)-phenyl} 1-methylethyl]carbamate, 1,3-dimethyl-3-(t-amylperoxy) butyl N-[1-{3(1-methylethenyl)-phenyl}-1-methylethyl] carbamate, 1,3-dimethyl-3-(cumylperoxy))butyl N-[1-{3-(1-methylethenyl)-phenyl}-1-methylethyl]carbamate, 1, 1-di(t-butylperoxy)-3,3,5-trimethylcyclohexane, 1, 1-di(t-butylperoxy)cyclohexane, n-butyl 4,4-di(t-amylperoxy) valerate, ethyl 3,3-di(t-butylperoxy)butyrate, 2,2-di(t-amylperoxy)propane, 3,6,6,9,9-pentamethyl-3-ethoxycabonylmethyl-1,2,4,5-tetraoxacyclononane, n-butyl-4,4-bis(t-butylperoxy)valerate, ethyl-3,3-di(t-amylperoxy)butyrate, benzoyl peroxide, OO-t-butyl-O-hydrogen-monoperoxy-succinate, OO-t-amyl-O-hydrogen-monoperoxy-succinate, 3,6,9, triethyl-3,6,9-trimethyl-1,4,7-triperoxynonane (or methyl ethyl ketone peroxide cyclic trimer), methyl ethyl ketone peroxide cyclic dimer, 3,3,6,6,9,9-hexamethyl-1,2,4,5-tetraoxacyclononane, 2,5-dimethyl-2,5-di(benzoylperoxy) hexane, t-butyl perbenzoate, t-butylperoxy acetate, t-butylperoxy-2-ethyl hexanoate, t-amyl perbenzoate, t-amyl peroxy acetate, t-butyl peroxy isobutyrate, 3-hydroxy-1,1-dimethyl t-butyl peroxy-2-ethyl hexanoate, OO-t-amyl-O-hydrogen-monoperoxy succinate, OO-t-butyl-O-hydrogen-monoperoxy succinate, di-t-butyl diperoxyphthalate, t-butylperoxy (3,3,5-trimethylhexanoate), 1,4-bis(t-butylperoxycarbo)cyclohexane, t-butylperoxy-3,5,5-trimethylhexanoate, t-butyl-peroxy-(cis-3-carboxy)propionate, allyl 3-methyl-3-t-butylperoxy butyrate, OO-t-butyl-O-isopropylmonoperoxy carbonate, OO-t-butyl-O-(2-ethyl hexyl)monoperoxy carbonate, 1,1,1-tris[2-(t-butylperoxy-carbonyloxy)ethoxymethyl]propane, 1,1,1-tris[2-(t-amylperoxy-carbonyloxy)ethoxymethyl]propane, 1,1,1-tris[2-(cumylperoxy-cabonyloxy) ethoxymethyl]propane, OO-t-amyl-O-isopropylmonoperoxy carbonate, di(4-methylbenzoyl)peroxide, di(3-methylbenzoyl)peroxide, di(2-methylbenzoyl)peroxide, didecanoyl peroxide, dilauroyl peroxide, 2,4-dibromo-benzoyl peroxide, succinic acid peroxide, dibenzoyl peroxide, di(2,4-dichloro-benzoyl)peroxide, and combinations thereof.

In one or more embodiments, polymer compositions in accordance with the present disclosure may contain a percent by weight of the total composition (wt %) of one or more peroxide agents that ranges from a lower limit selected from one of 0.01 wt %, 0.1 wt %, 0.15 wt %, 0.4 wt %, 0.6 wt %, 0.75 wt % and 1 wt %, to an upper limit selected from one of 0.5 wt %, 1.25 wt %, 2 wt %, 4 wt %, and 5 wt %, where any lower limit can be used with any upper limit. Further, it is envisioned that the concentration of the peroxide agent may be more or less depending on the application of the final material.

Unsaturated Aromatic Hydrocarbon

Polymer compositions in accordance with the present disclosure include unsaturated aromatic hydrocarbons having at least one double bond and an aromatic ring in its structure. Unsaturated aromatic hydrocarbons may be used to accelerate the reaction between an EVA resin and additional comonomers in the presence of a peroxide agent, because unsaturated aromatic hydrocarbons increase the half-life of the peroxide agent and the reactions of the radicals produced by the peroxide with the styrene are energetically more viable than with the EVA chain.

In one or more embodiments, unsaturated hydrocarbon monomers in accordance with the present disclosure may have the general formula: Ar—$(CH_2)_n$—$C(R^1)$=$C(R^2)_2$, where $R^1$ and each $R^2$ are independently selected from hydrogen and C1-C4 alkyl; Ar is a phenyl group or substituted phenyl group having substituents such as halo, C1-C4 alkyl, and C1-C4 haloalkyl; and n has a value from zero to 6. In some embodiments, the unsaturated aromatic hydrocarbon may be styrene, α-alkylstyrene, α-methylstyrene, p-methylstyrene, diethylene substituted benzene-derived compounds such as divinylbenzene.

In one or more embodiments, polymer compositions in accordance with the present disclosure may contain a percent by weight of the total composition (wt %) of one or more unsaturated aromatic monomer that ranges from a lower limit selected from one of 0.01 wt %, 0.025 wt % and 0.25 wt % to an upper limit selected from one of 0.75 wt %, 1 wt % and 3 wt %, where any lower limit can be used with any upper limit.

Additives

Polymer compositions in accordance with the present disclosure may include fillers and additives that modify various physical and chemical properties when added to the polymer composition during blending that include one or more polymer additives such as kickers, processing aids, lubricants, antistatic agents, clarifying agents, nucleating agents, beta-nucleating agents, slipping agents, antioxidants, antacids, light stabilizers such as HALS, IR absorbers, whitening agents, organic and/or inorganic dyes, anti-blocking agents, processing aids, flame-retardants, plasticizers, biocides, and adhesion-promoting agents.

Polymer compositions in accordance with the present disclosure may include one or more inorganic fillers such as talc, glass fibers, marble dust, cement dust, clay, carbon black, feldspar, silica or glass, fumed silica, silicates, calcium silicate, silicic acid powder, glass microspheres, mica, metal oxide particles and nanoparticles such as magnesium oxide, antimony oxide, zinc oxide, inorganic salt particles and nanoparticles such as barium sulfate, wollastonite, alumina, aluminum silicate, titanium oxides, calcium carbonate, polyhedral oligomeric silsesquioxane (POSS).

In one or more embodiments, polymer compositions in accordance with the present disclosure may contain a percent by weight of the total composition (wt %) of one or more fillers that ranges from a lower limit selected from one of 0.02 wt %, 0.05 wt %, 0.1 wt %, 0.15 wt %, 0.5 wt %, 0.6 wt %, 0.75 wt %, and 1 wt %, to an upper limit selected from one of 0.3 wt %, 0.6 wt %, 1.25 wt %, 2 wt %, 4 wt %, and 5 wt %, where any lower limit can be used with any upper limit. In some embodiments, polymer compositions may contain a silica filler at a percent by weight of the composition ranging from 0.02 wt % to 5 wt %, 0.5 wt % to 2 wt %, or 0.75 wt % to 1.25 wt %.

In one or more embodiments, polymer compositions may be formulated as an adhesive composition that possesses a maximum adhesive strength of greater than 20 N. In some embodiments, polymer compositions may exhibit an adhesive strength of greater than 30 N. For example, the maximum adhesive strength may be in a range of 20 N to 50 N.

Polymer Composition Preparation Methods

Polymer compositions in accordance with the present disclosure may be prepared by a number of possible polymer blending and formulation techniques, which will be discussed in the following sections.

In-Reactor Synthesis

In one or more embodiments, polymer compositions in accordance with the present disclosure may be prepared in reactor. Ethylene, vinyl acetate, and one or more polar comonomers are added in a reactor to polymerize. In some embodiments, the ethylene, vinyl acetate and one or more polar comonomers are polymerized by high pressure radical polymerization, wherein peroxide agents act as polymerization initiators. In some embodiments, the ethylene, the vinyl acetate, the polar comonomers and the peroxide agents are added at elevated pressure into an autoclave or tubular reactor at a temperature of between 80° C. and 300° C. and a pressure inside the reactor between 500 bar and 3000 bar in some embodiments, and a pressure between 1000 bar and 2600 bar in some embodiments.

Reactive Extrusion

In one or more embodiments, polymer compositions in accordance with the present disclosure may be prepared using continuous or discontinuous extrusion processes. Methods may use single-, twin- or multi-screw extruders, which may be used at temperatures ranging from 100° C. to 270° C. in some embodiments, and from 140° C. to 230° C. in some embodiments. In one or more embodiments, methods of preparing polymer compositions may involve a single extrusion or multiple extrusions in which polymer components and peroxide agents may be simultaneously or separately added. In some embodiments, raw materials are added to an extruder into the main or secondary feeder in the form of powder, granules, flakes or dispersion in liquids as solutions, emulsions and suspensions of one or more components.

Prior to addition to an extruder, polymer composition components may be pre-dispersed using intensive mixers or the like. Inside the extrusion equipment, components may be heated by heat exchange and/or mechanical friction, which may induce phase melting and dispersion by the deformation of the polymer. In some embodiments, one or more compatibilizing agents may be used to facilitate and/or refine the distribution of the polymer phases between insoluble or poorly soluble polymer mixtures and to enable the formation of the morphology of conventional blend and/or of semi-interpenetrating network at the interface between the phases. Peroxide agents may be added at the same extrusion stage as the EVA resin (or ethylene and vinyl acetate monomers) and additional comonomers, or in a consecutive extrusion process, according to selectivity and reactivity of the system.

Applications

In one or more embodiments, polymer compositions can be used in various molding processes, including extrusion molding, injection molding, thermoforming, cast film extrusion, blown film extrusion, foaming, extrusion blow-molding, ISBM (Injection Stretched Blow-Molding), 3D printing, rotomolding, pultrusion, and the like, to produce manufactured articles.

Polymer compositions in accordance with the present disclosure may be used to generate adhesive films for fabrics and non-woven materials including fabric, non-woven, polyurethane, EVA, polypropylene, polyethylene, polyvinylchloride polymer, polyester, polyamide, and the like. In some embodiments, polymer compositions may be incorporated into an adhesive film that is used to form a multi-layer article containing one or more adhesive layers and one or more substrate layers that include the fabrics and non-wovens. Substrate layers may take the form of films, blocks, or sheets in various embodiments.

Films prepared from polymer compositions may be suitable for dubbing woven and non-woven fabrics (NWF) obtained from natural fibers such as cotton and wool, or synthetic fibers such as polyesters and polyolefins including polypropylene. In some embodiments, adhesive films prepared from polymers compositions containing EVA and one or more additional comonomers may exhibit at least 50% higher delamination strength over comparative unmodified EVA resin formulations. In one or more embodiments, an adhesive film comprising the modified EVA of the present disclosure may be used in a multi-layer article, where the adhesive film may be applied to a substrate such as a film, sheet, or block, for example. Thus, for example in particular embodiments, the multilayer article of the present disclosure may include at least one layer of the modified EVA with at least a second layer that may be a substrate made by materials selected from fabric, non-wovens, polyurethane, EVA, polypropylene, polyethylene, polyvinylchloride polymer, polyester, and polyamide, for example.

Polymer compositions in accordance with the present disclosure may also be formulated for a number of polymer articles, including the production of insoles, midsole, soles, hot-melt adhesives, primers, in civil construction as linings, industrial floors, acoustic insulation. Other applications may include furniture, electro-electronic, automotive, sports, packaging, and others.

In one or more embodiments, modified EVA compositions may be formulated as a concentrated masterbatch for the production of blends with other resins. Masterbatch compositions may then be combined with other polymers to generate a polymer working stock. The mixture for obtaining the blend may be carried out in any conventional mixing process of resins, such as the solubilization and extrusion processes discussed above. In one or more embodiments, polymer compositions may be formulated as a masterbatch that is added at a percent by weight of 1 wt % to 20 wt % to a polymer resin to create a working stock.

Polymeric Resin

In one or more embodiments, polymer compositions may include other polymeric resins in addition to the modified EVA of the present disclosure. In some embodiments, a masterbatch formulation may be prepared from an EVA resin (or ethylene and vinyl acetate monomers) and one or more polar comonomers that is later combined with a polymeric resin to generate a working stock for the production of adhesives or polymer articles. In one or more embodiments, the polymeric resin to which the modified EVA is added includes polar functionality, i.e, is a polar polymer. In such a manner, in addition to the use of the modified EVA as an adhesive, it is also envisioned that the modified EVA polymer of the present disclosure may serve as a compatibilizer for other polymeric resins, including, for example a polar polymer. In some embodiments, such compositions (combination of modified EVA with a polymeric resin) may be used to increase the adhesive strength of the polymer resin alone.

In one or more embodiments, the modified EVA may serve as a compatibilizer between incompatible or thermodynamically immiscible polymeric resins to produce blends which exhibit good mechanical properties and processing, for a wide variety of polymeric resins, where the compatibilizer decreases the interfacial tension between the two phases.

Polymeric resins in accordance with the present disclosure include, for example, polyethylene, polyethylene copolymers such as ethylene maleic anhydride and the like, polypropylene, polystyrene, polybutadiene, polyvinylchloride, ethylene-vinyl acetate copolymer (EVA), polyesters such as polyethylene terephthalate (PET), polyhydroxyalkanoate (PHA), high impact polystyrene (HIPS), and acrylonitrile butadiene styrene (ABS), polyurethane, elastomers such as 5-vinyl-2-norbornene-EPDM, polysulfide rubber, ethylene propylene rubber (EPM), poly(ethylene-methyl acrylate), poly(ethylene-acrylate), ethylene propylene diene rubber (EPDM), vinyl silicone rubber (VMQ), fluorosilicone (FVMQ), nitrile rubber (NBR), acrylonitrile-butadiene-styrene (ABS), styrene butadiene rubber (SBR), styrene-butadiene-styrene block copolymers (SBS), styrene-ethylene-butylene-styrene triblock copolymer (SEBS), polybutadiene rubber (BR), styrene-isoprene-styrene block copolymers (SIS), partially hydrogenated acrylonitrile butadiene (HNBR), natural rubber (NR), synthetic polyisoprene rubber (IR), neoprene rubber (CR), polychloropropene, bromobutyl rubber, chlorobutyl rubber, chlorinated poly(ethylene), vinylidene fluoride copolymers (CFM), silicone rubber, vinyl silicone rubber, chlorosulfonated poly(ethylene), fluoroelastomer, elastomeric polyolefins such as ethylene C3-C12 alpha olefin copolymer, and combinations thereof.

In some embodiments, the modified EVA may serve as compatilizer in polyolefins and biopolymer blends. The biopolymers may include, but are not limited to, starch, polysaccharides such as cellulose and methylcellulose, polylactic acid (PLA), polyhydroxyalkanoates (PHA) such as polyhydroxybutyrate (PHB), polyhydroxyvalerate (PHV), polyhydroxyhexanoate (PHH), polyhydroxyoctanoate (PHO) and copolymers thereof, and combinations thereof.

EXAMPLES

The following examples are merely illustrative, and should not be interpreted as limiting the scope of the present disclosure.

Example 1

In this example a polymer composition is prepared using a mixture of two polar comonomers tert-butylaminoethylmethacrylate (TBAEMA) and itaconic acid, and unsaturated aromatic hydrocarbon styrene. The polymer composition was prepared by mixing the components as shown in Table 1.

TABLE 1

Sample masterbatch formulation for Example 1

| COMPONENTS | VALUE (% by weight) |
| --- | --- |
| TBAEMA | 3 |
| itaconic acid | 4 |
| styrene | 0.5 |
| Trigonox ® 101 (AkzoNobel) | 0.7 |
| barium sulfate | 0.3 |
| silica | 1 |
| EVA with 28% vinyl acetate content | 90.5 |

In Table 1, unsaturated aromatic hydrocarbon styrene is used to accelerate the reaction, because the reactions of the radicals produced by the peroxide with the styrene are energetically more viable than with the EVA chain. Silica is used to reduce the poor odor released by styrene during the extrusion process by means of physical adsorption.

Polymer compositions in Example 1 were produced by mixing the components in twin screw extruder, ZSK 26, with regular EVA extrusion processing conditions. Following granulation, a blended sample formulation was compared to a standard EVA resin. For the blended sample, 5% by mass of formulation from Table 1 was mixed in EVA resin with 28% vinyl acetate content using a twin screw extruder ZSK 26.

Next, 80 µm thick films were obtained by processing in a blow film extruder. These films were then subjected to the adhesion process using a conventional press for fabrics. Sample films were adhered to woven or nonwoven substrates to generated layered compositions. For this example, the film layers included a layer of PVC, being a PVC film with a thickness of 1 mm; the sample polymer composition layer; and a non-woven layer, being a polyester film with a thickness of 1 mm.

After the adhesion process, the film layers were subjected to the delamination force analysis to verify the adhesion of the film to the substrates. Tests were performed according to ASTM D1876. With particular respect to FIG. 1, it is observed that the blended sample exhibited higher adhesion strength than the comparative unmodified EVA resin.

Example 2

In the next example, masterbatch formulations were prepared from an EVA resin functionalized with TBAEMA and itaconic acid that was compared with a second formulation containing TBAEMA and a third formulation containing itaconic acid. To obtain the composition, the components were mixed in the amounts indicated in Table 2. Styrene was added to increase the half-life of the peroxide agent Trigonox, and silica was used to reduce the poor odor released by styrene during the extrusion process.

TABLE 2

Composition of the masterbatches

| Composition | Sample | | |
|---|---|---|---|
| | HM2528_IA_TB Weight/% | HM2528_TB Weight/% | HM2528_IA Weight/% |
| HM2528 (by Braskem) | 90.8 | 90.8 | 90.8 |
| Itaconic acid | 4 | — | 7 |
| Styrene | 0.5 | 0.5 | 0.5 |
| TBAEMA | 3 | 7 | — |
| Trigonox 101 | 0.7 | 0.7 | 0.7 |
| Silica | 1 | 1 | 1 |

The polymer samples were produced by mixing the components shown in Table 2, in a ZSK18 twin screw extruder. In a second step, the masterbatch compositions were diluted to 5 wt % in an EVA resin HM728F (commercially available by Braskem) having 28 wt % of vinyl acetate content in a ZSK 26 twin screw extruder.

Figure 2:
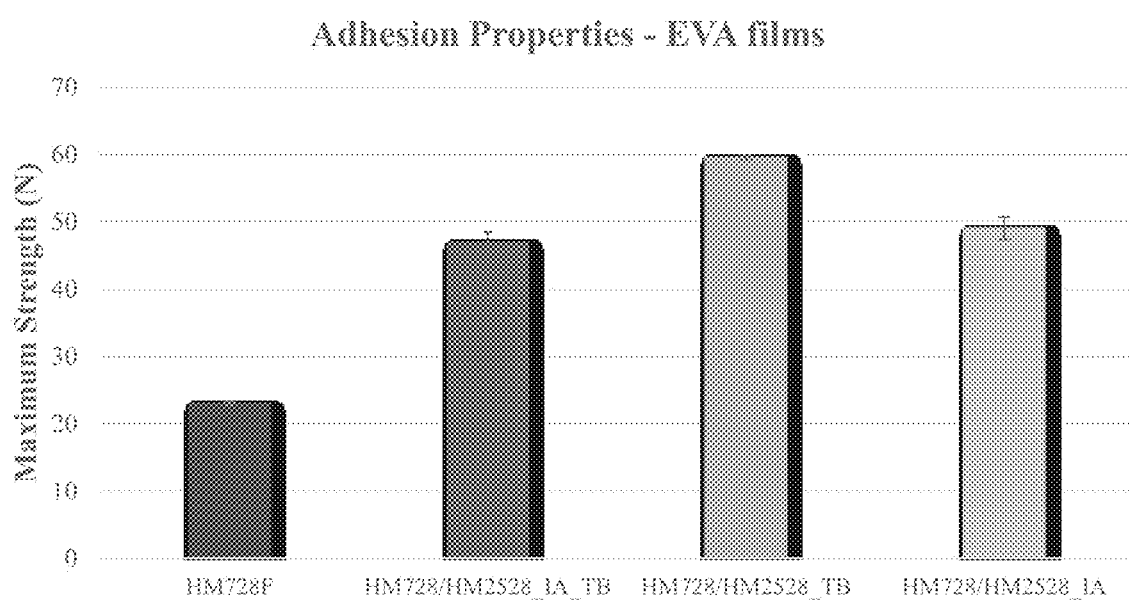

From these resins, films were obtained by blow films extrusion with thickness of 80 μm. These samples were submitted to the delamination force test according to ASTM D1876 to verify the adhesion of the EVA films to non-woven (polyester), and PVC. To prepare the samples specimens, sandwiches of non-woven (polyester) layer (1 mm thick), sample polymer composition film layer (80 μm thick) and PVC layer (1 mm thick) were prepared using a conventional fabric press and cut using a stamper. These specimens have a width of 25 mm and the extremities or flaps were placed between the claws of a tensile testing machine, the maximum force applied to separating the two extremities will be the response of the adhesion force of the EVA film to the respective substrates. FIG. 2 shows the result of the adhesion strength of the Pure EVA HM728F resin and modified EVA resins.

With particular respect to FIG. 2, the adhesion results indicated that the modified EVA resins had higher adhesion strength when compared to the pure EVA resin. Furthermore, the adhesion results indicated the EVA modified with TBAEMA presented the greatest adhesion strength, i.e., the best resistance to adhesion to the PVC substrate. This can indicate that the addition of the co-monomer TBAEMA to the EVA matrix allowed the increase of the polarity of the resin, the presence of NH functional groups in the polymer allow the formation of chemical bonds with the EVA surface, giving a greater adhesion strength with the PVC substrate. In addition, adhesion failure modes were also recorded for each specimen to assay the quality of the delamination result. When the EVA adhesive film is adhered to both substrates, the term "cohesive failure" is used. When the adhesive is adhered to only one of the substrates, the term "adhesive failure" is used. Cohesive failure is often regarded as a more preferred result because it indicates that an adhesive adhered to both substrates.

Figure 3:
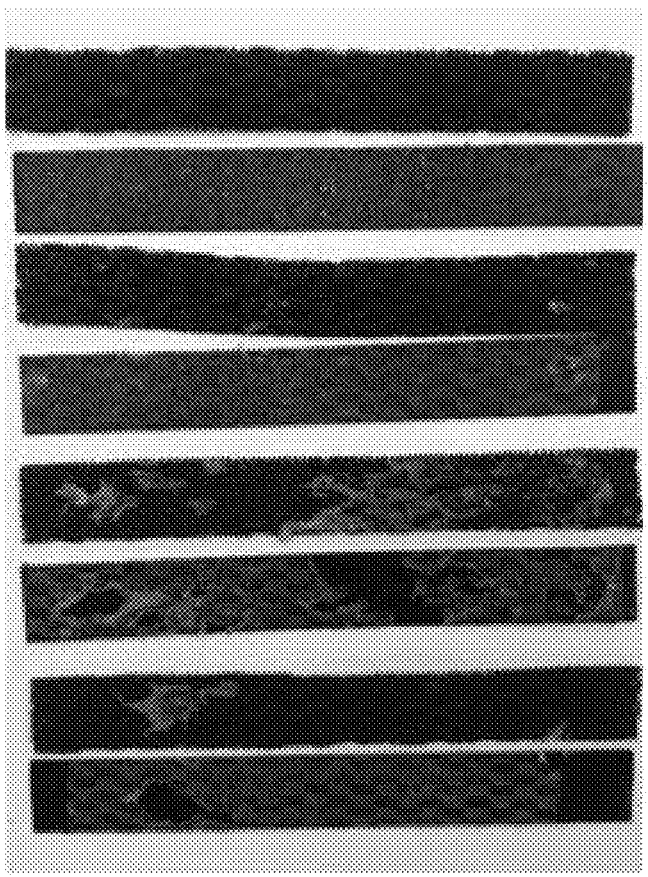
FIG. 3 shows comparative pictures of delamination tests for film samples in accordance with embodiments of the present disclosure.

FIG. 3 shows the failure types in the EVA specimens after the delamination force analysis. These specimens indicated that the modified EVA samples (HM728/HM2528_IA and HM728/HM2528_TB) presented the cohesive failure type and it is more pronounced compared to the EVA resin modified with itaconic acid together with TBAEMA (HM728/HM2528_IA_TB). On the other hand, the pure EVA (HM728F) presented an adhesive failure type.

Example 3

In the next example, characterizations were performed that showed that the bulk property of the material was not altered. The thermal properties of the resins were investigated through differential scanning calorimetry (DSC) as determined by ASTM D3418 and thermogravimetric analysis (TGA) as determined by ASTM E1131. Test specimens were prepared from compression molded plate according to ASTM D 4703. The results are shown in Table 3.

TABLE 3

Thermal properties results obtained through the DSC and Vinyl acetate content and decomposition temperatures for assayed samples

| Samples | Tc (° C.) | Tm2 (° C.) | AV content (%) | Weight Loss 20% (° C.) | Weight Loss 80% (° C.) |
|---|---|---|---|---|---|
| HM728F (control) | 29 | 54 | 72 | 28 | 365 | 480 |
| HM728/ HM2528_IA_TB | 29 | 53 | 73 | 29 | 363 | 481 |
| HM728/HM2528_TB | 30 | 55 | 73 | 28 | 367 | 482 |
| HM728/HM2528_IA | 29 | 53 | 72 | 29 | 362 | 481 |

Samples assayed presented similar thermal behavior, with no indication of change in the resins after the processing and also the addition of the monomers. The results of the TGA analysis indicated that all samples exhibited similar thermal characteristics. In addition, the resins were also analyzed for the Melt Flow Index (g/10 min) at 190° C.@2.16 kg as determined by ASTM D1238, GPC (g/mol) as determined by ISO 16014, Vicat 10N (° C.) as determined by ASTM D1525 and Water Contact Angle (WCA)(°) as determined by ASTM D5946 and the results are presented in Table 4.

TABLE 4

Pure EVA and modified EVA resin properties

| Sample | Melt Flow Index | GPC | | Vicat 10N (° C.) | WCA (°) |
|---|---|---|---|---|---|
| | | Mn (g/mol) | Mw/Mn | | |
| HM728F (Control) | 6.0 | 15079 | 4.6 | 43.0 | 86 |
| HM728/HM2528_IA_TB | 5.13 | 15100 | 4.4 | 41.6 | 84 |
| HM728/HM2528_TB | 5.19 | 14700 | 4.5 | 43.1 | 75 |
| HM728/HM2528_IA | 5.07 | 14900 | 4.5 | 40.5 | 67 |

The results indicated that the sampled resins maintained their original properties and were not structurally modified. The Melt Flow Index of the samples remained around 5, the GPC results indicated that the molar mass of the resins was practically the same and the polydispersity index was around 4.5, indicating that there was no modification in the molar mass of these resins and nor dispersion for smaller or larger molecule sizes. The softening temperature showed results around 42° C. for the samples. The wettability of the surface of the samples increased for the resins modified with the monomers, indicating a reduction in the WCA, these results corroborate with the results of the adhesion strength of these EVA resins.

Example 4

Figure 4:
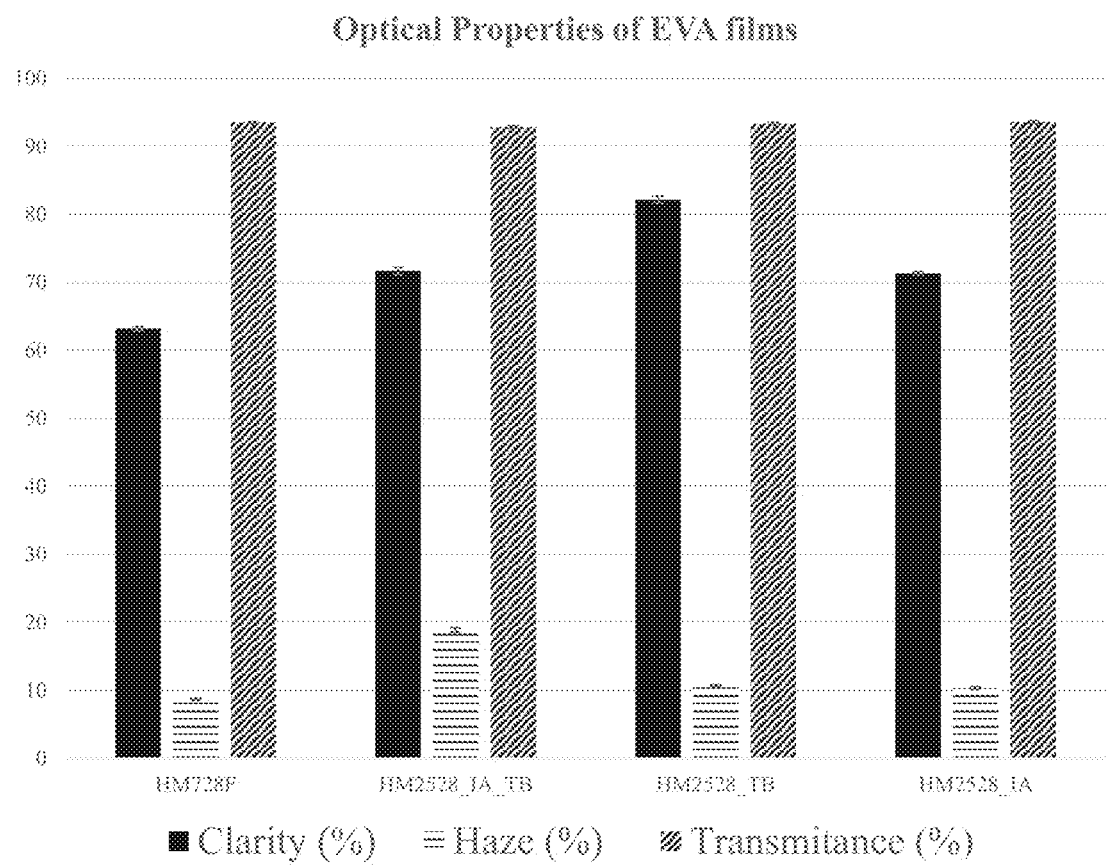
FIG. 4 is bar charts showing the results of optical tests for film samples in accordance with embodiments of the present disclosure.

In the next example, optical properties of the modified EVA films were evaluated. Clarity, haze and transmittance of the control and modified films were measured according to ASTM D1003. The results can be seen in the FIG. 4. By the addition of TBAEMA and Itaconic acid to the EVA resin the clarity increased when compared to the pure EVA resin. In addition, the haze results of the films with the addition of comonomers has decreased, indicating that the modification of the EVA resin with the polar comonomers presents good adhesion and optical properties.

Although the preceding description is described herein with reference to particular means, materials and embodiments, it is not intended to be limited to the particulars disclosed herein; rather, it extends to all functionally equivalent structures, methods and uses, such as are within the scope of the appended claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(0 for any limitations of any of the claims herein, except for those in which the claim expressly uses the words 'means for' together with an associated function.

What is claimed:

1. A composition, comprising:
   an EVA polymer produced from ethylene, vinyl acetate, and one or more polar comonomers, wherein at least one of the one or more polar comonomers comprises an amine moiety, wherein the amine of the one or more polar comonomers is a primary amine or a secondary amine, and
   wherein the EVA polymer has a number average molecular weight (Mn) ranging from 5 to 50 kDa, and
   wherein the one or more polar comonomers are present at a percent by weight of the composition (wt %) ranging from 0.25 wt % to 25 wt %.

2. The composition of claim 1, wherein the composition comprises EVA at a percent by weight of the composition (wt %) ranging from 55 wt % to 99 wt %.

3. The composition of claim 1, wherein the EVA comprises a vinyl acetate content at a percent by weight (wt %) of the EVA component ranging from 8 wt % and 40 wt %.

4. The composition of claim 1, wherein the one or more polar comonomers comprise tert-butylaminoethyl methacrylate.

5. The composition of claim 1, wherein the composition further comprises one or more additional comonomers selected from a group consisting of unsaturated polycarboxylic acid, unsaturated anhydrides and unsaturated multiesters.

6. The composition of claim 5, wherein the polar comonomers to additional comonomers molar ratio ranges from 0.035 to 7.

7. The composition of claim 1, further comprising one or more an unsaturated aromatic hydrocarbon.

8. The composition of claim 7, wherein the composition comprises one or more unsaturated aromatic hydrocarbons at a percent by weight of the composition (wt %) ranging from 0.01 wt % to 3 wt %.

9. The composition of claim 7, wherein the one or more unsaturated aromatic hydrocarbons is styrene.

10. The composition of claim 1, wherein the polymer is produced with the addition of a peroxide agent added at a percent by weight of the composition (wt %) ranging from 0.01 wt % to 5 wt %.

11. A composition, comprising:
    an EVA polymer produced from ethylene, vinyl acetate, and one or more polar comonomers, wherein at least one of the one or more polar comonomers comprises an amine moiety; and
    wherein the one or more polar comonomers are present at a percent by weight of the composition (wt %) ranging from 0.25 wt % to 25 wt %; and
    wherein the composition further comprises a silica in at a percent by weight (wt %) ranging from 0.02 wt % to 5 wt %.

12. A composition, comprising:
    an EVA polymer produced from ethylene, vinyl acetate, and one or more polar comonomers, wherein at least one of the one or more polar comonomers comprises an amine moiety; and
    wherein the one or more polar comonomers are present at a percent by weight of the composition (wt %) ranging from 0.25 wt % to 25 wt %; and
    wherein the composition is a masterbatch that is added at a percent by weight (wt %) of 1 wt % to 20 wt % to a polymeric resin.

13. A method of preparing a polymer composition, the method comprising:
    adding ethylene, vinyl acetate and one or more polar comonomers to a reactor, wherein at least one of the one or more polar comonomers comprise an amine moiety; and
    reacting the ethylene, vinyl acetate and one or more comonomers to produce the polymer composition comprising an EVA polymer,
    wherein the amine of the one or more polar comonomers is a primary amine or a secondary amine, and
    wherein the EVA polymer has a number average molecular weight (Mn) ranging from 5 to 50 kDa, and
    wherein the one or more polar comonomers are present at a percent by weight of the composition (wt %) ranging from 0.25 wt % to 25 wt %.

14. A method of preparing a polymer composition, the method comprising:
    adding an ethylene vinyl acetate (EVA) polymer and one or more polar comonomers to an extruder, wherein at least one of the one or more polar comonomers comprise an amine moiety; and
    reacting the EVA polymer and one or more comonomers to produce the polymer composition,
    wherein at least one of the one or more polar comonomers comprises an amine moiety; and
    wherein the one or more polar comonomers are present at a percent by weight of the composition (wt %) ranging from 0.25 wt % to 25 wt %; and
    wherein the composition is a masterbatch that is added at a percent by weight (wt %) of 1 wt % to 20 wt % to a polymeric resin.

15. The method of claim 14, wherein adding EVA and one or more polar comonomers to the extruder is performed in sequence.

16. The method of claim 14, wherein adding EVA and one or more polar comonomers to the extruder is performed simultaneously.

17. The method of claim 14, wherein the combining the masterbatch composition with the polymeric resin is performed in a second extruder.

18. The method of claim 14, further comprising forming the polymer composition into a film.

\* \* \* \* \*